United States Patent [19]

Hunt

[11] 4,312,985
[45] Jan. 26, 1982

[54] DISPERSE DYES FROM HETEROCYCLIC ACETONITRILES

[75] Inventor: Keith Hunt, Liverpool, England

[73] Assignee: Eastman Kodak Company, Rochester, N.Y.

[21] Appl. No.: 182,732

[22] Filed: Aug. 29, 1980

[30] Foreign Application Priority Data

May 16, 1980 [GB] United Kingdom ............... 16213/80

[51] Int. Cl.³ .................. C07D 277/64; C07D 263/54
[52] U.S. Cl. .................................... 542/457; 542/429;
542/430; 542/431; 542/435; 542/454; 542/455;
542/458
[58] Field of Search ............... 542/182, 520, 429, 454,
542/457, 430, 431, 435, 455, 458

[56] References Cited
U.S. PATENT DOCUMENTS

| | | | |
|---|---|---|---|
| 2,850,520 | 9/1958 | Bottmingen | 542/457 |
| 2,953,561 | 9/1960 | Doorenbos et al. | 542/457 |
| 3,157,663 | 11/1964 | Bencze | 542/457 |
| 3,890,364 | 6/1975 | Knupfer et al. | 542/457 |
| 3,917,604 | 11/1975 | Hoyle | 544/105 |
| 3,920,720 | 11/1975 | Beecken | 542/438 |
| 3,969,346 | 7/1976 | Koller et al. | 542/457 |
| 4,077,962 | 3/1978 | Beecken | 544/105 |

Primary Examiner—Arthur P. Demers
Attorney, Agent, or Firm—Donald W. Spurrell; Daniel B. Reece, III

[57] ABSTRACT

Disclosed are disperse dyes for the dyeing of synthetic fibers such as cellulose acetate, triacetate, polyamide, and especially polyester and its blends, which have the general formula

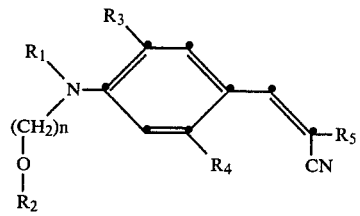

in which $R_1$ is selected from hydrogen, aryl, cyclohexyl, lower alkyl and lower alkyl substituted by Cl, CN, $OC_2H_4OC_2H_5$,

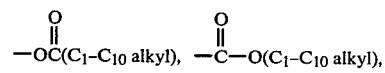

lower alkoxy, aryl, NHCONHPh, OCONHPh, phthalimido, succinimido, or aryloxy, which aryloxy may be substituted by one or more of Cl, Br, $NO_2$, CN, lower alkyl, lower alkoxy, aryl and aryloxy; $R_2$ is phenyl or phenyl substituted with 1–3 of lower alkyl, lower alkoxy,

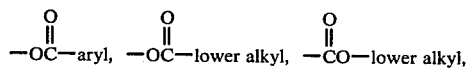

—CN, —Cl or —$NO_2$; $R_3$ is H, Cl, lower alkyl or lower alkoxy; $R_1$ and $R_3$ may form a 5 or 6 membered ring preferably substituted by 1–3 methyl groups; $R_4$ is H, Cl, lower alkyl or lower alkoxy; $R_5$ is selected from 3-pyridyl, 3-benzisothiazolyl, 2-benzothiazolyl, 2-benzoxazolyl, 2-quinoxalyl, 2-quinazolinonyl, 2-1,3,4-oxadiazolyl, 2-1,3,4-thiadiazolyl and 2-thienyl, which $R_5$ heterocycles may be substituted by Cl, Br, $NO_2$, CN, aryl, aryl substituted by Cl, Br, $NO_2$ or CN, lower alkyl or $COOR_6$ wherein $R_6$ is lower alkyl or aryl; and n is 1–4.

5 Claims, No Drawings

DISPERSE DYES FROM HETEROCYCLIC ACETONITRILES

This invention concerns novel heterocyclic methine dyes prepared for example from heterocyclc acetonitriles and formylated compounds, and their use in dyeing synthetic fibers such as polyester and cellulosics. These dyes give deep yellow or orange to neutral yellow shades of excellent fastness properties and dyeability.

The dyes have the formula

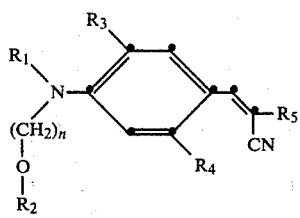

in which $R_1$ is selected from hydrogen, aryl, cyclohexyl, lower alkyl and lower alkyl substituted by Cl, CN, $OC_2H_4OC_2H_5$,

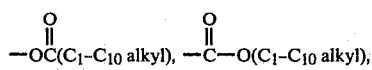

lower alkoxy, aryl, NHCONHPh, OCONHPh, phthalimido, succinimido, or aryloxy, which aryloxy may be substituted by one or more of Cl, Br, $NO_2$, CN, lower alkyl, lower alkoxy, aryl and aryloxy; $R_2$ is phenyl or phenyl substituted with 1-3 of lower alkyl, lower alkoxy,

—CN, —Cl or —$NO_2$; $R_3$ is H, Cl, lower alkyl or lower alkoxy; $R_1$ and $R_3$ may form a 5 or 6 membered ring preferably substituted by 1-3 methyl groups; $R_4$ is H, Cl, lower alkyl or lower alkoxy; $R_5$ is selected from 3-pyridyl, 3-benzisothiazolyl, 2-benzothiazolyl, 2-benzoxazolyl, 2-quinoxalyl, 2-quinazolinonyl, 2-1,3,4-oxadiazolyl, 2-1,3,4-thiadiazolyl and 2-thienyl, which heterocycles may be substituted by Cl, Br, $NO_2$, CN, aryl, aryl substituted by Cl, Br, $NO_2$ or CN, lower alkyl or $COOR_6$ wherein $R_6$ is lower alkyl or aryl. The term "lower" as used herein means 1-6 carbons.

The present dyes have outstanding pH stability, color strength, fastness and dyeing properties, for the conventional dyeing of polyester fiber and its blends, and other synthetic fibers e.g. cellulose acetate, triacetate, and the like. The dyes also have good pH stability in the dyebath, good sublimation and lightfastness properties, and show little or no variation in shade or strength when dyed at 110° and 130° on polyester. The dyes also have improved color strength when compared with other commonly used dyes e.g. C. I. Disperse Yellow 54. Methine dyes which have found value in the dyeing of polyester are generally greenish yellow in shade, but the methine dyes of this invention are normally orange to neutral yellow in shade.

The dyeing of the fiber material mentioned with the dyestuffs according to the invention is appropriately carried out from an aqueous suspension in the presence of carriers at between 80° and 110° C., in the absence of carriers at between 100°-130° C., or using the so-called thermofixing process at 180°-230° C. The printing of the materials can be carried out by steaming the goods, printed with the new dyestuffs, in the presence of a carrier at temperatures between 80° C. and 110° C. or also in the absence of a carrier at 110°-140° C., or also by treating the goods, printed with the new dyestuffs, according to the so-called thermofixing process at 180°-230° C.

This invention will be further illustrated by the following example although it will be understood that this example is included merely for purposes of illustration and is not intended to limit the scope of the invention.

EXAMPLE 1

4-Formyl-N-ethyl-N-(β-4-methoxy phenoxy ethyl)-3-methylaniline (1.565 g, 0.005 mole) was dissolved in ethyl alcohol (40 ml). To this was added 2-benzothiazoleacetonitrile (0.85 g, 0.005 mole) and piperidine (0.1 ml) and the mixture was warmed on a steam bath for 15 minutes, then left to cool overnight. The orange crystalline product was collected by filtration and air dried. The dye was ball milled in the presence of a lignin sulphonate dispersing agent for 24 hours and the resulting dispersion was applied to polyester fiber by dyeing at 130° for 1 hour. It gave a deep yellow dyeing of excellent color strength and fastness. Similar dyeings prepared in dyebaths buhfered from pH 4-8 also gave high strength dyeings indicating the dye had excellent pH stability.

By application of the synthetic procedures outlined in Example 1, the following dyes of the general formula shown where n is 2, were prepared. When applied by a procedure similar to the above they gave high strength dyeings on polyester fiber.

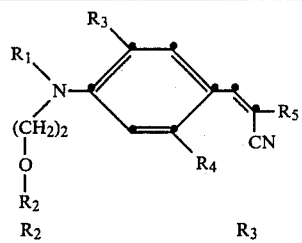

| Example | $R_1$ | $R_2$ | $R_3$ | $R_4$ | $R_5$ |
|---|---|---|---|---|---|
| 2 | $C_6H_{11}$ |  | H | H | benzothiazolyl |

-continued $$\begin{array}{c} R_1\\ \diagdown\\ N\\ \diagup\\ (CH_2)_2\\ |\\ O\\ |\\ R_2 \end{array} \begin{array}{c} R_3\\ \\ \\ \\ \\ R_4 \end{array} \begin{array}{c} \\ \\ =C \diagup R_5 \diagdown CN \end{array}$$

| Example | R₁ | R₂ | R₃ | R₄ | R₅ |
|---|---|---|---|---|---|
| 3 | CH₂C₆H₅ | " | " | " | benzoxazolyl |
| 4 | Me | CH₃ CH₃ (phenyl) | " | " | benzothiazolyl |
| 5 | Et | (phenyl) | Me | Me | benzothiazolyl |
| 6 | " | " | " | " | benzoxazolyl |
| 7 | C₂H₄OC₂H₄OC₂H₅ | —(phenyl)—OCH₃ | H | " | benzothiazolyl |
| 8 | " | " | " | " | benzoxazolyl |
| 9 | C₂H₄N(COCH₂)(COCH₂) | OCH₃ (phenyl) | " | " | benzothiazolyl |
| 10 | " | " | " | " | benzoxazolyl |
| 11 | C₃H₇ | —(phenyl)—OCOCH₃ | " | " | benzoxazolyl |
| 12 | C₂H₄OCOC₃H₇ | —(phenyl)—COOCH₃ | " | " | benzothiazolyl |
| 13 | CH₃ | —(phenyl)—CN | " | " | benzothiazolyl |
| 14 | " | —(phenyl)—Cl | " | " | benzothiazolyl |
| 15 | " | —(phenyl)—NO₂ | " | " | benzothiazolyl |
| 16 | C₂H₄CN | (phenyl) | H | CH₃ | 5-chloro-benzoxazolyl |
| 17 | C₂H₄COC₄H₉ (C₂H₄C(O)—OC₄H₉) | " | H | CH₃ | 3-benzisothiazolyl |
| 18 | C₂H₄OPh | CH₃ CH₃ (phenyl) | H | CH₃ | 3-benzisothiazolyl |
| 19 | C₂H₄NHCONHPh | (phenyl) | H | CH₃ | 5-cyano-benzoxazolyl |
| 20 | CH₃ | " | H | CH₃ | 3-pyridyl |
| 21 | CH₃ | (phenyl) | H | H | 5-bromo-benzoxazolyl |
| 22 | C₂H₄CN | " | H | H | 5-nitro-benzoxazolyl |
| 23 | C₂H₅ | OCH₃ (phenyl) | H | CH₃ | 3-pyridyl |
| 24 | C₂H₄ | " | CH₃ | OCH₃ | " |
| 25 | C₂H₄OC₂H₄OC₂H₅ | —(phenyl)—OCOCH₃ | CH₃ | OCH₃ | " |
| 26 | C₂H₅ | —(phenyl)—COOCH₃ | Cl | Cl | " |

-continued $$\begin{array}{c}R_1\\ \diagdown N\\ \diagup\\ (CH_2)_2\\ |\\ O\\ |\\ R_2\end{array}\!\!\!-\!\!\!\begin{array}{c}R_3\\ \text{Ar}\\ R_4\end{array}\!\!\!-\!\!\!CH\!=\!C\begin{array}{c}R_5\\ \diagdown\\ CN\end{array}$$

| Example | R₁ | R₂ | R₃ | R₄ | R₅ |
|---|---|---|---|---|---|
| 27 | C₂H₅ | (phenyl with CN) | H | H | 5-cyano-benzoxazolyl |
| 28 | C₂H₅ | (phenyl with Cl) | H | H | 5-cyano-benzoxazolyl |
| 29 | C₂H₄OPh—p-OCH₃ | (phenyl with NO₂) | H | H | 5-methyl-benzoxazolyl |
| 30 | C₂H₄N(COCH₂)(COCH₂) | (phenyl) | CH₃ | CH₃ | 5-COOCH₃—benzoxazolyl |
| 31 | C₂H₅ | " | CH₃ | CH₃ | 2-quinoxalyl |
| 32 | CH₂C₆H₅ | (phenyl with CH₃, CH₃) | H | CH₃ | 5-nitro-benzoxazolyl |
| 33 | C₂H₅ | (phenyl) | H | CH₃ | 2-quinoxalyl |
| 34 | C₂H₅ | " | H | CH₃ | " |
| 35 | H | (phenyl with OCH₃) | OC₂H₅ | OC₂H₅ | " |
| 36 | C₂H₄CN | " | H | CH₃ | 5-chloro-benzothiazolyl |
| 37 | C₂H₄—N(phthalimido) | (phenyl with OCH₃) | H | CH₃ | 5-chloro-benzothiazolyl |
| 38 | C₂H₅ | " | H | CH₃ | 2-quinoxalyl |
| 39 | C₂H₅ | (phenyl with OCOCH₃) | H | CH₃ | " |
| 40 | C₂H₄OCONHPh | (phenyl with COOCH₃) | H | CH₃ | " |
| 41 | C₆H₁₁ | (phenyl with CN) | H | H | " |
| 42 | C₂H₄CN | (phenyl with Cl) | H | H | 5-nitro-benzothiazolyl |
| 43 | C₂H₄OC₂H₄OC₂H₅ | (phenyl with NO₂) | H | CH₃ | 2-Quinazolinonyl |
| 44 | C₂H₄Cl | (phenyl) | CH₃ | OCH₃ | " |
| 45 | C₂H₄Cl | " | CH₃ | OCH₃ | " |
| 46 | C₆H₁₁ | (phenyl with CH₃, CH₃) | Cl | Cl | " |
| 47 | C₂H₄OPh—p-Cl | (phenyl) | H | H | 5-cyano-benzothiazolyl |
| 48 | C₂H₄OPh—p-NO₂ | " | H | H | 5-cyano- |

-continued

[Structure: A benzene ring with R3 at top, R4 on the ring, substituted with N(R1)(CH2)2-O-R2 on one side and =CR5(CN) on the other]

| Example | R₁ | R₂ | R₃ | R₄ | R₅ |
|---|---|---|---|---|---|
| 49 | C₂H₄OPh—p-OCH₃ | (phenyl)—OCH₃ | H | H | benzothiazolyl 5-methyl-benzothiazolyl |
| 50 | C₂H₄OCONHPh | " | CH₃ | CH₃ | 5-COOCH₃—benzothiazolyl |
| 51 | C₂H₅ | (phenyl with OCH₃) | CH₃ | CH₃ | 5-COOCH₃—benzothiazolyl |
| 52 | C₂H₄—N(phthalimido) | " | H | CH₃ | 5-nitro-benzothiazolyl |
| 53 | C₂H₄OPh | (phenyl)—OCOCH₃ | H | CH₃ | 5-nitro-benzothiazolyl |
| 54 | C₂H₄NHCONHPh | (phenyl)—COOCH₃ | H | CH₃ | 5-nitro-benzothiazolyl |
| 55 | C₂H₄Ph | (phenyl)—CN | OC₂H₅ | OC₂H₅ | 5-nitro-benzothiazolyl |
| 56 | C₂H₄CN | (phenyl)—Cl | H | CH₃ | 5-phenyl-1,3,4-oxadiazolyl |
| 57 | C₂H₄—N(phthalimido) | (phenyl)—NO₂ | H | CH₃ | 2-1,3,4-thiadiazolyl |
| 58 | C₂H₅ | (phenyl) | H | CH₃ | " |
| 59 | C₆H₅ | " | H | CH₃ | " |
| 60 | C₆H₅ | (2,6-dimethylphenyl) | H | CH₃ | " |
| 61 | CH₃ | (phenyl) | H | H | " |
| 62 | C₂H₄CN | " | H | H | 2-thienyl |
| 63 | C₂H₄CN | (phenyl)—OCH₃ | H | CH₃ | " |
| 64 | CH₂Cl | " | CH₃ | OCH₃ | " |
| 65 | H | (phenyl with OCH₃) | CH₃ | OCH₃ | " |
| 66 | C₂H₄O—C₂H₅ | " | Cl | Cl | " |
| 67 | C₂H₄OPh—p-Br | (phenyl)—OCOCH₃ | H | H | " |
| 68 | C₂H₄OPh—p-CN | (phenyl)—COOCH₃ | H | H | " |

-continued

[Structure: benzene ring with N(R1)(CH2)2-O-R2 substituent, R3 and R4 on ring, and CH=C(CN)(R5) group]

| Example | R₁ | R₂ | R₃ | R₄ | R₅ |
|---|---|---|---|---|---|
| 69 | C₂H₄OPh—p-OCH₃ | [furan with CN] | H | H | 3-benziso-thiazolyl |
| 70 | C₂H₄OPh—p-CN | [furan with Cl] | CH₃ | CH₃ | 3-benziso-thiazolyl |
| 71 | C₂H₄OCONHPh | [furan with NO₂] | CH₃ | CH₃ | 3-benziso-thiazolyl |
| 72 | CH₂C₆H₅ | [furan] | H | CH₃ | 3-benziso-thiazolyl |
| 73 | C₂H₄OPh—p-CH₃ | " | H | CH₃ | 3-benziso-thiazolyl |
| 74 | C₂H₄NHCONHPh | [furan with two CH₃] | H | CH₃ | 3-benziso-thiazolyl |
| 75 | C₂H₄Ph | [furan] | OC₂H₅ | OC₂H₅ | 3-benziso-thiazolyl |
| 76 | C₂H₄OPh—p-OPh | [furan with COOCH₃] | H | H | 2-1,3,4-oxadiazolyl |
| 77 | C₂H₄OPh—p-OCH₃ | [furan with CN] | H | H | " |
| 78 | C₂H₄OPh—p-Ph | [furan with Cl] | CH₃ | CH₃ | " |
| 79 | C₂H₄OCONHPh | [furan with NO₂] | CH₃ | CH₃ | " |
| 80 | C₆H₁₁ | [furan] | H | CH₃ | " |
| 81 | C₂H₄OPh | " | H | CH₃ | " |
| 82 | C₂H₄NHCONHPh | [furan with two CH₃] | H | CH₃ | " |
| 83 | C₂H₄Ph | [furan] | OC₂H₅ | OC₂H₅ | " |

Also, the dyes of the formula below are prepared by procedures similar to Example 1

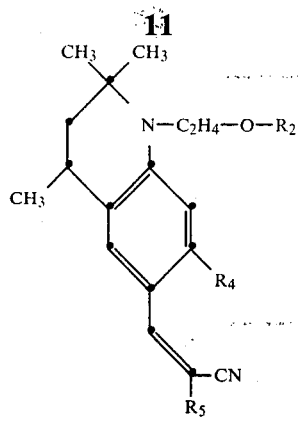

| Example | R₂ | R₄ | R₅ |
|---|---|---|---|
| 84 | phenyl | H | benzothiazolyl |
| 85 | 4-OCOCH₃-phenyl | " | benzoxazolyl |
| 86 | 4-COOCH₃-phenyl | " | 5-phenyl 1,3,4-oxadiazolyl |
| 87 | 4-OCH₃-phenyl | " | benzothiazolyl |
| 88 | " | " | benzoxazolyl |
| 89 | 2-CH₃-phenyl | " | benzothiazolyl |
| 90 | " | " | benzoxazolyl |
| 91 | 4-CN-phenyl | " | benzothiazolyl |
| 92 | " | " | benzoxazolyl |
| 93 | 4-n-C₃H₇-phenyl | " | benzothiazolyl |
| 94 | " | " | benzoxazolyl |
| 95 | phenyl | Me | benzothiazolyl |
| 96 | " | " | benzoxazolyl |
| 97 | " | " | 5-phenyl-1,3,4-oxadiazolyl |
| 98 | 4-OCH₃-phenyl | " | benzothiazolyl |
| 99 | " | " | benzoxazolyl |
| 100 | " | " | 5-phenyl-1,3,4-oxadiazolyl |
| 101 | 2-OCH₃-4-NO₂-phenyl | " | benzothiazolyl |
| 102 | 2-OCH₃-phenyl | " | benzoxazolyl |
| 103 | " | " | 5-phenyl-1,3,4-oxadiazolyl |
| 104 | phenyl | H | 5-chloro-benzoxazolyl |
| 105 | 4-OCOCH₃-phenyl | CH₃ | 5-chloro-benzoxazolyl |
| 106 | " | H | 5-chloro-benzoxazolyl |
| 107 | 4-COOCH₃-phenyl | H | 5-chloro-benzoxazolyl |
| 108 | 4-OCH₃-phenyl | H | 5-chloro-benzoxazolyl |
| 109 | " | CH₃ | 5-chloro-benzoxazolyl |
| 110 | 2-CH₃-phenyl | H | 5-chloro-benzoxazolyl |
| 111 | 4-NO₂-phenyl | H | 5-chloro-benzoxazolyl |
| 112 | 4-CN-phenyl | H | 5-chloro-benzoxazolyl |
| 113 | " | H | 5-chloro-benzothiazolyl |
| 114 | 4-n-C₃H₇-phenyl | CH₃ | 5-chloro-benzothiazolyl |
| 115 | " | H | 5-chloro-benzothiazolyl |
| 116 | phenyl | H | 5-chloro-benzothiazolyl |
| 117 | " | H | 5-chloro-benzothiazolyl |
| 118 | " | CH₃ | 5-chloro-benzothiazolyl |
| 119 | 4-OCH₃-phenyl | H | 5-chloro-benzothiazolyl |
| 120 | " | H | 5-chloro-benzothiazolyl |
| 121 | " | H | 5-chloro-benzothiazolyl |
| 122 | 2-CH₃-4-OCOCH₃-phenyl | H | 5-phenyl-1,3,4-oxadiazolyl |
| 123 | " | CH₃ | 5-phenyl-1,3,4-oxadiazolyl |
| 124 | 2-CH₃-4-COOCH₃-phenyl | H | 5-phenyl-1,3,4-oxadiazolyl |
| 125 | 2-CH₃-4-OCH₃-phenyl | H | 5-phenyl-1,3,4-oxadiazolyl |
| 126 | " | H | 5-phenyl-1,3,4-oxadiazolyl |
| 127 | 2-CH₃-4-Cl-phenyl | CH₃ | 5-phenyl-1,3,4-oxadiazolyl |
| 128 | " | H | 5-phenyl-1,3,4-oxadiazolyl |
| 129 | 2-CH₃-4-CN-phenyl | H | 5-phenyl-1,3,4-oxadiazolyl |
| 130 | " | Cl | 5-phenyl-1,3,4-oxadiazolyl |
| 131 | phenyl | H | 3-pyridyl |
| 132 | 4-OCOCH₃-phenyl | CH₃ | " |
| 133 | " | H | " |

-continued

| Example | R₂ | R₄ | R₅ |
|---|---|---|---|
| 134 | —⌬—COOCH₃ | H | " |
| 135 | —⌬—OCH₃ | H | " |
| 136 | " | CH₃ | " |
| 137 | CH₃-⌬ | OCH₃ | " |
| 138 | " | H | " |
| 139 | —⌬—CN | H | " |
| 140 | " | H | " |
| 141 | —⌬—n-C₃H₇ | CH₃ | " |
| 142 | " | H | " |
| 143 | —⌬ | H | " |
| 144 | " | H | " |
| 145 | " | CH₃ | " |
| 146 | —⌬—OCH₃ | H | " |
| 147 | " | H | " |
| 148 | —⌬ | Cl | 3-benzisothiazolyl |
| 149 | —⌬—OCOCH₃ | CH₃ | 3-benzisothiazolyl |
| 150 | " | H | 3-benzisothiazolyl |
| 151 | —⌬—COOCH₃ | H | 3-benzisothiazolyl |
| 152 | —⌬—OCH₃ | H | 3-benzisothiazolyl |
| 153 | " | CH₃ | 3-benzisothiazolyl |
| 154 | CH₃-⌬-NO₂ | H | 3-benzisothiazolyl |
| 155 | " | H | 3-benzisothiazolyl |
| 156 | —⌬—CN | H | 3-benzisothiazolyl |
| 157 | " | H | 3-benzisothiazolyl |
| 158 | —⌬—n-C₃H₇ | CH₃ | 3-benzisothiazolyl |
| 159 | " | H | 3-benzisothiazolyl |
| 160 | —⌬ | H | 3-benzisothiazolyl |
| 161 | " | H | 3-benzisothiazolyl |
| 162 | " | CH₃ | 3-benzisothiazolyl |
| 163 | —⌬—OCH₃ | H | 3-benzisothiazolyl |
| 164 | " | OCH₃ | 3-benzisothiazolyl |
| 165 | —⌬ | H | 2-quinoxalyl |
| 166 | —⌬—OCOCH₃ | CH₃ | " |
| 167 | " | H | " |
| 168 | —⌬—COOCH₃ | H | " |
| 169 | —⌬—OCH₃ | H | " |
| 170 | " | CH₃ | " |
| 171 | CH₃-⌬ | H | " |
| 172 | " | H | " |
| 173 | —⌬—CN | H | " |
| 174 | " | H | " |
| 175 | —⌬—n-C₃H₇ | CH₃ | " |
| 176 | " | H | " |
| 177 | —⌬ | Cl | " |
| 178 | " | H | " |
| 179 | " | CH₃ | " |
| 180 | —⌬—OCH₃ | H | " |
| 181 | " | H | " |
| 182 | —⌬ | H | 2-quinazolinonyl |
| 183 | —⌬—OCOCH₃ | CH₃ | " |
| 184 | " | H | " |
| 185 | —⌬—COOCH₃ | H | " |
| 186 | —⌬—OCH₃ | H | " |
| 187 | " | CH₃ | " |
| 188 | CH₃-⌬ | OCH₃ | " |
| 189 | " | H | " |
| 190 | —⌬—CN | H | " |
| 191 | " | H | " |
| 192 | —⌬—n-C₃H₇ | CH₃ | " |
| 193 | " | H | " |
| 194 | —⌬ | H | " |
| 195 | " | H | " |
| 196 | " | CH₃ | " |
| 197 | —⌬—OCH₃ | H | " |
| 198 | " | H | " |
| 199 | —⌬ | H | 2-1,3,4-oxadiazolyl |
| 200 | —⌬—OCOCH₃ | CH₃ | 2-1,3,4-oxadiazolyl |
| 201 | " | H | 2-1,3,4-oxa- |

-continued

| Example | R₂ | R₄ | R₅ |
|---|---|---|---|
| 202 | —⟨furyl⟩—COOCH₃ | H | 2-1,3,4-oxadiazolyl |
| 203 | —⟨furyl⟩—OCH₃ | H | 2-1,3,4-oxadiazolyl |
| 204 | " | CH₃ | 2-1,3,4-oxadiazolyl |
| 205 | CH₃—⟨furyl⟩ | H | 2-1,3,4-oxadiazolyl |
| 206 | " | H | 2-1,3,4-oxadiazolyl |
| 207 | —⟨furyl⟩—CN | H | 2-1,3,4-oxadiazolyl |
| 208 | " | H | 2-1,3,4-oxadiazolyl |
| 209 | —⟨furyl⟩—n-C₃H₇ | CH₃ | 2-1,3,4-oxadiazolyl |
| 210 | " | H | 2-1,3,4-oxadiazolyl |
| 211 | ⟨furyl⟩ | H | 2-1,3,4-oxadiazolyl |
| 212 | " | H | 2-1,3,4-oxadiazolyl |
| 213 | " | CH₃ | 2-1,3,4-oxadiazolyl |
| 214 | —⟨thienyl⟩—OCH₃ | H | 2-1,3,4-oxadiazolyl |
| 215 | " | H | 2-1,3,4-oxadiazolyl |
| 216 | ⟨thienyl⟩ | H | 2-1,3,4-thiadiazolyl |
| 217 | —⟨thienyl⟩—OCOCH₃ | CH₃ | 2-1,3,4-thiadiazolyl |
| 218 | " | H | 2-1,3,4-thiadiazolyl |
| 219 | —⟨thienyl⟩—COOCH₃ | H | 2-1,3,4-thiadiazolyl |
| 220 | —⟨thienyl⟩—OCH₃ | H | 2-1,3,4-thiadiazolyl |
| 221 | " | CH₃ | 2-1,3,4-thiadiazolyl |
| 222 | CH₃—⟨thienyl⟩ | H | 2-1,3,4-thiadiazolyl |
| 223 | " | H | 2-1,3,4-thiadiazolyl |
| 224 | —⟨thienyl⟩—CN | H | 2-1,3,4-thiadiazolyl |
| 225 | " | H | 2-1,3,4-thiadiazolyl |
| 226 | —⟨thienyl⟩—n-C₃H₇ | CH₃ | 2-1,3,4-thiadiazolyl |
| 227 | " | H | 2-1,3,4-thiadiazolyl |
| 228 | " | H | 2-1,3,4-thiadiazolyl |
| 229 | " | H | 2-1,3,4-thiadiazolyl |
| 230 | " | CH₃ | 2-1,3,4-thiadiazolyl |

-continued

| Example | R₂ | R₄ | R₅ |
|---|---|---|---|
| 231 | —⟨furyl⟩—OCH₃ | OCH₃ | 2-1,3,4-thiadiazolyl |
| 232 | " | H | 2-1,3,4-thiadiazolyl |
| 233 | ⟨furyl⟩ | H | 2-thienyl |
| 234 | —⟨furyl⟩—OCOCH₃ | CH₃ | " |
| 235 | " | H | " |
| 236 | —⟨furyl⟩—COOCH₃ | H | " |
| 237 | —⟨furyl⟩—OCH₃ | Cl | " |
| 238 | " | CH₃ | " |
| 239 | CH₃—⟨furyl⟩ | H | " |
| 240 | " | H | " |
| 241 | " | H | " |
| 242 | —⟨furyl⟩—CN | H | " |
| 243 | " | CH₃ | " |
| 244 | —⟨furyl⟩—n-C₃H₇ | H | " |
| 245 | " | H | " |
| 246 | " | H | " |
| 247 | " | CH₃ | " |
| 248 | —⟨furyl⟩—OCH₃ | H | " |
| 249 | " | H | " |

The invention has been described in detail with particular reference to preferred embodiments thereof, but it will be understood that variations and modifications can be effected within the spirit and scope of the invention.

I claim:

1. A compound of the formula

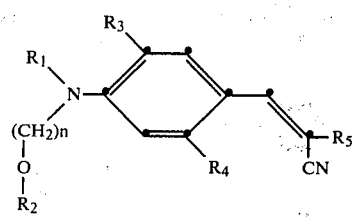

in which R₁ is selected from hydrogen, aryl cyclohexyl, lower alkyl and lower alkyl substituted with Cl, CN, OC₂H₄OC₂H₅,

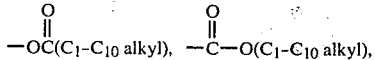

—OC(C₁-C₁₀ alkyl),  —C—O(C₁-C₁₀ alkyl), lower alkoxy, aryl, NHCONHPh, OCONHPh, phthalimido, succinimido, aryloxy and aryloxy substituted with one or more of Cl, Br, NO₂, CN, lower alkyl, lower alkoxy, aryl and aryloxy; $R_2$ is phenyl or phenyl substituted with 1-3 of lower alkyl, lower alkoxy,

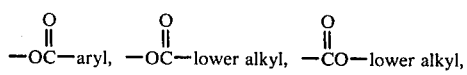

—CN, —Cl or —NO$_2$; $R_3$ is H, Cl, lower alkyl or lower alkoxy; $R_1$ and $R_3$ combined form —CH$_2$CH$_2$CH$_2$— unsubstituted or substituted with 1-3 methyl groups; $R_4$ is H, Cl, lower alkyl or lower alkoxy; $R_5$ is selected from 3-pyridyl, 3-benzisothiazolyl, 2-benzothiazolyl, 2-benzoxazolyl, 2-quinoxalyl, 2-quinazolinonyl, 2-1,3,4-oxadiazolyl, 2-1,3,4-thiadiazolyl and 2-thienyl, which $R_5$ heterocycles are unsubstituted or substituted with Cl, Br, NO$_2$, CN, aryl, aryl substituted with Cl, Br, NO$_2$ or CN, lower alkyl, or COOR$_6$ wherein $R_6$ is lower alkyl or aryl; and n is 1-4.

2. A compound according to claim 1 having the formula

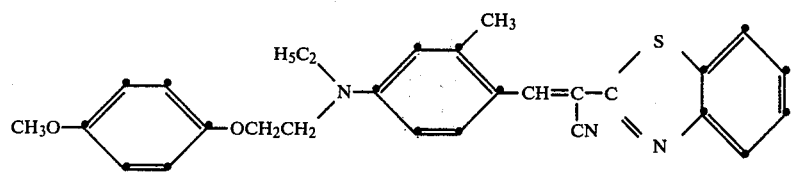

3. A compound according to claim 1 having the formula

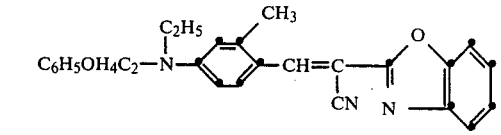

4. A compound according to claim 1 having the formula

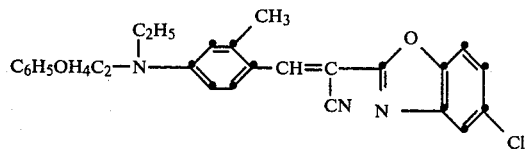

5. A compound according to claim 1 havng the formula

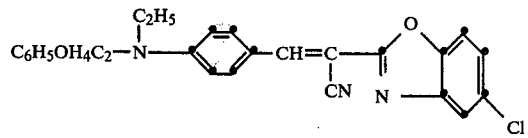

* * * * *